US012072071B2

(12) United States Patent
Martinez

(10) Patent No.: US 12,072,071 B2
(45) Date of Patent: Aug. 27, 2024

(54) MODULAR LAMPS AND METHODS OF USING MODULAR LAMPS

(71) Applicant: Michael A. Martinez, Hobart, IN (US)

(72) Inventor: Michael A. Martinez, Hobart, IN (US)

( * ) Notice: Subject to any disclaimer, the term of this patent is extended or adjusted under 35 U.S.C. 154(b) by 0 days.

(21) Appl. No.: 17/694,227

(22) Filed: Mar. 14, 2022

(65) Prior Publication Data

US 2022/0290823 A1 Sep. 15, 2022

Related U.S. Application Data

(60) Provisional application No. 63/160,788, filed on Mar. 13, 2021.

(51) Int. Cl.

*F21L 4/04* (2006.01)
*F21S 2/00* (2016.01)
*F21V 23/00* (2015.01)
*F21V 23/06* (2006.01)

(52) U.S. Cl.

CPC ............... *F21L 4/045* (2013.01); *F21S 2/005* (2013.01); *F21V 23/001* (2013.01); *F21V 23/06* (2013.01)

(58) Field of Classification Search

CPC ........ F21V 23/06; F21V 23/001; F21V 21/06; F21V 17/18; F21V 17/06; F21V 17/006; F21S 2/005; F21S 6/002–003; F21L 4/045

See application file for complete search history.

(56) References Cited

U.S. PATENT DOCUMENTS 4,502,102 A * 2/1985 Phipps .................... F21L 4/005 362/399
7,938,555 B1 * 5/2011 Kalhofer ................... F21L 4/08 362/183
10,082,257 B1 * 9/2018 Beranek .................. H02J 7/342
2005/0185398 A1 * 8/2005 Scannell, Jr. ............ A01G 9/02 362/227

OTHER PUBLICATIONS

Innovation Q+ NPL Search (Year: 2024).*

* cited by examiner

*Primary Examiner* — Anabel Ton

(74) *Attorney, Agent, or Firm* — Hartman Global IP Law; Gary M. Hartman; Domenica N. S. Hartman

(57) ABSTRACT

Modular lamps and methods for their use. The modular lamps include a body and a light source carried by the body. The body is configured to operate a flashlight as the light source and to allow the flashlight to be removed from the base for use separately from the base and reinstalled to the base for use as the light source. The body may be configured to interchangeably operate either the flashlight or a lightbulb as the light source. The modular lamps may include a lamp base configured to be placed on a support surface to maintain the body in an upright position. The modular lamps may include a shade to shade light emitted as by the light source.

22 Claims, 15 Drawing Sheets

MODULAR LAMPS AND METHODS OF USING MODULAR LAMPS

CROSS-REFERENCE TO RELATED APPLICATIONS

This application claims the benefit of U.S. Provisional Application No. 63/160,788 filed Mar. 13, 2021, the contents of which are incorporated herein by reference.

BACKGROUND OF THE INVENTION

The invention relates generally to modular lamps and methods of using modular lamps.

A portable light source, such as a handheld flashlight, is often used as a backup source of light in emergency situations in the residential and commercial buildings, such as when electrical power is lost. Frequently however, flashlights are not regularly used and therefore are stored until a need for their use arises. This can lead to the flashlight sitting unused in a storage location for extended periods at a time between usages. Because of this, people may forget exactly where a flashlight is located when an emergency situation or other need arises. In addition, because of the long time periods between usages, the electrical power supplied by batteries to a flashlight may slowly drain over time such that the batteries do not have enough electrical charge to power the flashlight when a need for the flashlight arises. Either of these situations can dramatically decrease or even eliminate the benefits of having a flashlight for use in emergency situations. Therefore, it would be desirable to have a way to store a flashlight in residential and commercial buildings that would overcome one or more of these problems.

In addition, non-portable light sources, such as floor lamps and table lamps, typically only have a single intended or designed use configuration, e.g., to be used only as a floor lamp or to be used only as a table lamp. While this may be sufficient for many situations, in other situations it may be desirable to have a light source that can be easily configured to be either a floor lamp or a table lamp based on changes in the functional needs or aesthetic tastes of a user or different users. However, because typical lamps are designed for only either one or the other use, it would be necessary to obtain a second lamp if the type of usage were to change. Further, in some cases, the need or desire for a lamp may change such that another type of lighting system may be desired. Again, with typical lamps, a new piece of furniture would need to be obtained. Therefore, it would be desirable to have a lighting system that could be configured in multiple different ways to accommodate different needs or tastes and to be able to adapt to changing needs or tastes over time.

BRIEF SUMMARY OF THE INVENTION

The following disclosure describes modular lamps configured to utilize a handheld flashlight as a light source, and methods of using the modular lamps. The modular lamps and methods may be applied to any situation, location, or industry, in which there is a need or desire to have an area lamp, such as a floor lamp or table lamp, and also have a handheld flashlight for use separate and independent from the area lamp.

According to one nonlimiting aspect, a modular lamp includes a body, a light source carried by the body, and a shade supported by the body. The shade may be configured to shade the light source. The body may be configured to interchangeably operate either a flashlight or a lightbulb as the light source. The body may be configured to allow the flashlight to be removed from the body for use separately from the body and reinstalled to the body for use as the light source for the modular lamp.

According to another nonlimiting aspect, a modular lamp includes a body, a light source carried by the body, and a shade supported by the body. The body includes a lamp base configured to be placed on a support surface to maintain the body in an upright position. The light source may be a flashlight. The body may be configured to allow the flashlight to be removed from the body for use separately from the body and reinstalled to the body for use as the light source for the modular lamp.

According to yet another nonlimiting aspect, a modular lamp includes a light source comprising a rechargeable flashlight and optionally a light bulb, a body comprising a housing that provides a receptacle for the light source, and a power circuit configured to alternatively provide power to either the receptacle or the light source. The housing is configured to allow the rechargeable flashlight to be removed from the receptacle for use separately from the housing and installed in the receptacle for use as the light source for the modular lamp.

According to still another nonlimiting aspect, a method of using a modular lamp is provided. The modular lamp may include a light source including a flashlight carried by a body and a lamp base configured to be placed on a support surface to maintain the body in an upright position. The body may be configured to allow the flashlight to be removed from the body for use separately from the body and reinstalled to the body for use as the light source for the modular lamp. The method may include removing the flashlight from the body, and using the flashlight separately from the body. The method may further include reinstalling the flashlight to the body, and using the flashlight to provide a light while installed in the body.

In some arrangements, the modular lamp of the present disclosure may be configured as either a table lamp or a floor lamp, a shade of the modular lamp may be arrangeable to have two or more configurations, portions of the modular lamp may be reconfigured for use as a table and/or an ottoman, and/or the modular lamp may be configured to be assembled by a user, such as a purchaser or other end user, into any one of the configurations and/or possible combinations of configurations disclosed herein.

These and other aspects, arrangements, features, and/or technical effects will become apparent upon detailed inspection of the figures and the following description.

DETAILED DESCRIPTION OF THE INVENTION

Figure 1:
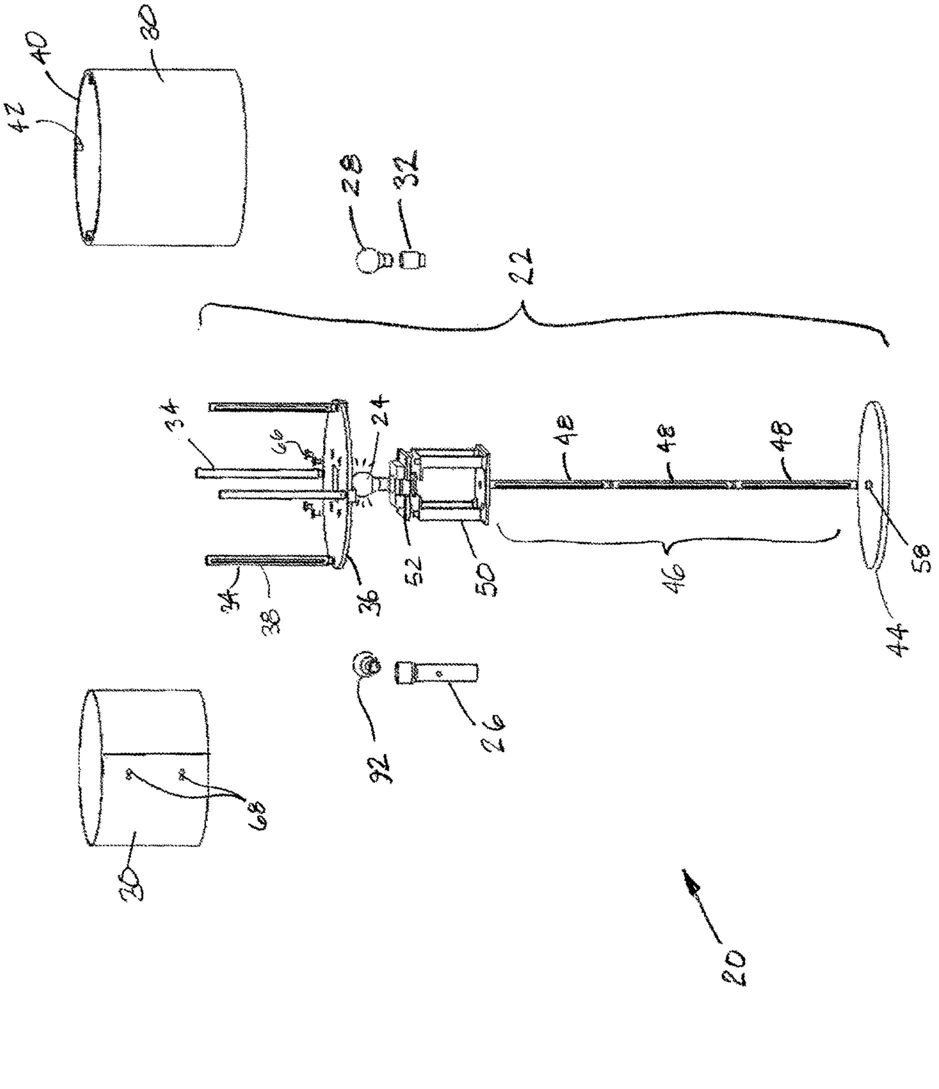
FIG. 1 is a perspective view of a modular lamp in a partially assembled condition according to certain nonlimiting aspects of the present disclosure.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Turning now to the nonlimiting embodiments represented in the drawings, FIG. 1 depicts a modular lamp 20 exemplifying some aspects of the invention. The modular lamp 20 includes a body 22 that comprises a housing 50 and preferably also an adapter 52 for accommodating at least one type of light source 24. The body 22 has a modular design that allows it to be configured in multiple different configurations as will become apparent hereinafter. The modular lamp 20 is represented in FIG. 1 as an area lamp configured to be used in what might be considered a non-portable manner (i.e., as opposed to a portable handheld flashlight, for example) by being used while supported on a floor or tabletop or other stable support surface in an upright position. To this end, the body 22 includes a lamp base 44 configured to be placed on a stable support surface and to maintain the body 22 in the upright position while so placed thereon. As noted, the housing 50 of the body 22 is capable of accommodating a flashlight 26 (FIG. 6) or a light bulb 28 and/or an assembly comprising a lightbulb 28 (FIGS. 9-12), and can alternatively receive and operate the flashlight 26 and/or lightbulb 28 as the light source 24 as described in more detail hereinafter. Preferably, the flashlight 26 is rechargeable. The modular lamp 20 may have a power circuit, such as an electrical power cord 76 or other type of electric circuit, configured to alternatively provide power to either the flashlight 26 or light bulb 28. A shade 30 supported by the body 22 may be provided so as to shade the light source 24, for example, by at least partially surrounding the light source 24 in a manner typical for light shades in floor lamps and table lamps.

The body 22 is configured such that the flashlight 26 can be inserted and carried therein in an operative position to generate a light. Typically, the light from the flashlight 26 will be shaded by the shade 30. In addition, the body 22 is configured such that the flashlight 26 can also be removed easily therefrom and used in a typical fashion as a portable handheld flashlight separate from the body 22 and the shade 30. After such use, the flashlight 26 may then be re-mounted to the body 22 to again be used as the light source 24 for the modular lamp 20. Preferably, the flashlight 26 includes rechargeable batteries that can be recharged by a supply of electric power while operatively mounted in the body 22. In this way, the modular lamp 20 allows the flashlight 26 to be stored in the modular lamp 20 in an easily accessible space, for example in a room of a residence or office, and because it can be used regularly as a lamp, its location is easily accessible when an emergency situation arises. In addition, if the flashlight 26 is powered with rechargeable batteries that are charged while operatively mounted in the body 22, then (assuming the modular lamp 20 is typically plugged into a power source) the user can be assured that the batteries for the flashlight 26 will have enough charge to power the flashlight 26 in the emergency situation. Thus, the modular lamp 20 can in some arrangements address one or more of the challenges identified previously with simply storing and not using a flashlight until an emergency arises.

The body 22 is also configured such that the lightbulb 28 may be interchanged with the flashlight 26 to be operatively mounted and used as the light source 24 for the modular lamp 20. That is, the flashlight 26 may be removed from the body 22, and the lightbulb 28 may be operatively mounted to the body 22 in place of the flashlight 26 to serve as the light source 24. The lightbulb 28 may be powered from the same supply of electric power that is used to power the flashlight 26. A socket adapter 32 may be provided to operatively mount the lightbulb 28 to the body 22 such that the lightbulb 28 is in the same or close to the same operative position of the light source 24 is when the flashlight 26 is operatively mounted to the body 22.

Figure 20B:
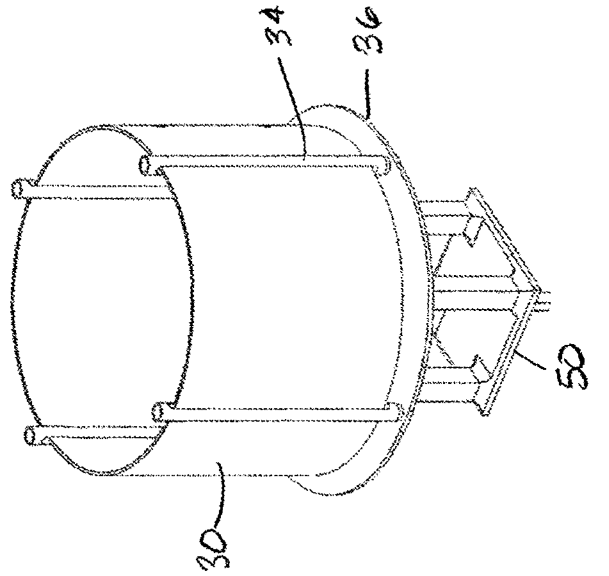
FIG. 20B is a perspective of the shade supported by the shade ribs in the first shade configuration.
Figure 20A:
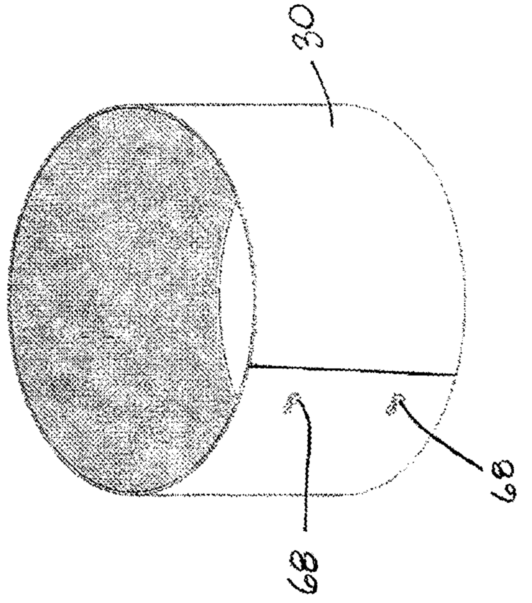
FIG. 20A a perspective view of the shade.
Figure 21B:
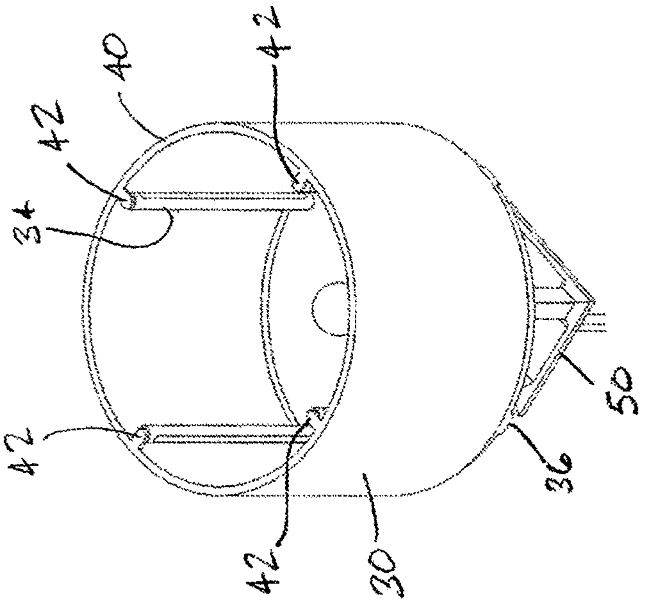
FIG. 21B is a perspective view of the shade in the second configuration and supported by the shade ribs in the second shade configuration.
Figure 21A:
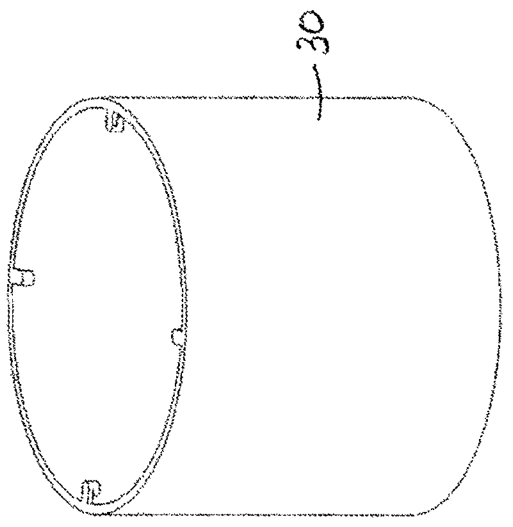
FIG. 21A is a perspective view of the second shade.

The shade 30 is configured such that it may be mounted to the body 22 in at least two different configurations. In the first configuration, which is shown in the left side of FIG. 1, as well as in FIGS. 2A, 2B, 13A, 13B, 20A, 20B, and FIG. 22, the shade 30 is formed of an elongate sheet of material with opposite ends that can be connected together by complimentary fasteners 68, such as a hook and keyhole connection as shown in FIG. 20A, to form a generally cylindrical shape. The elongate sheet of material, before the ends are so connected, can be secured to shade ribs 34 extending up from a shade base 36 by sliding through longitudinal slots 38 extending transversely through the shade ribs 34, and then subsequently connecting the opposite ends, as best seen in FIG. 20B. In the second the configuration, which is shown on the right side of FIG. 1, as well as in FIGS. 3A, 3B, 14A, 14B, FIG. 21A, and FIG. 21B, the shade 30 may include a support ring 40 that maintains the shade in a generally cylindrical shape and also includes a number of radially inwardly and downwardly oriented pegs 42 that mount to the top ends of the shade ribs 34, as best seen in FIG. 21B, such that the shade 30 hangs down from the top ends of the shade ribs 34. In this way, the shade 30 can be secured to the body 22 in at least two different configurations to accommodate the aesthetic taste of the user.

Figure 22:
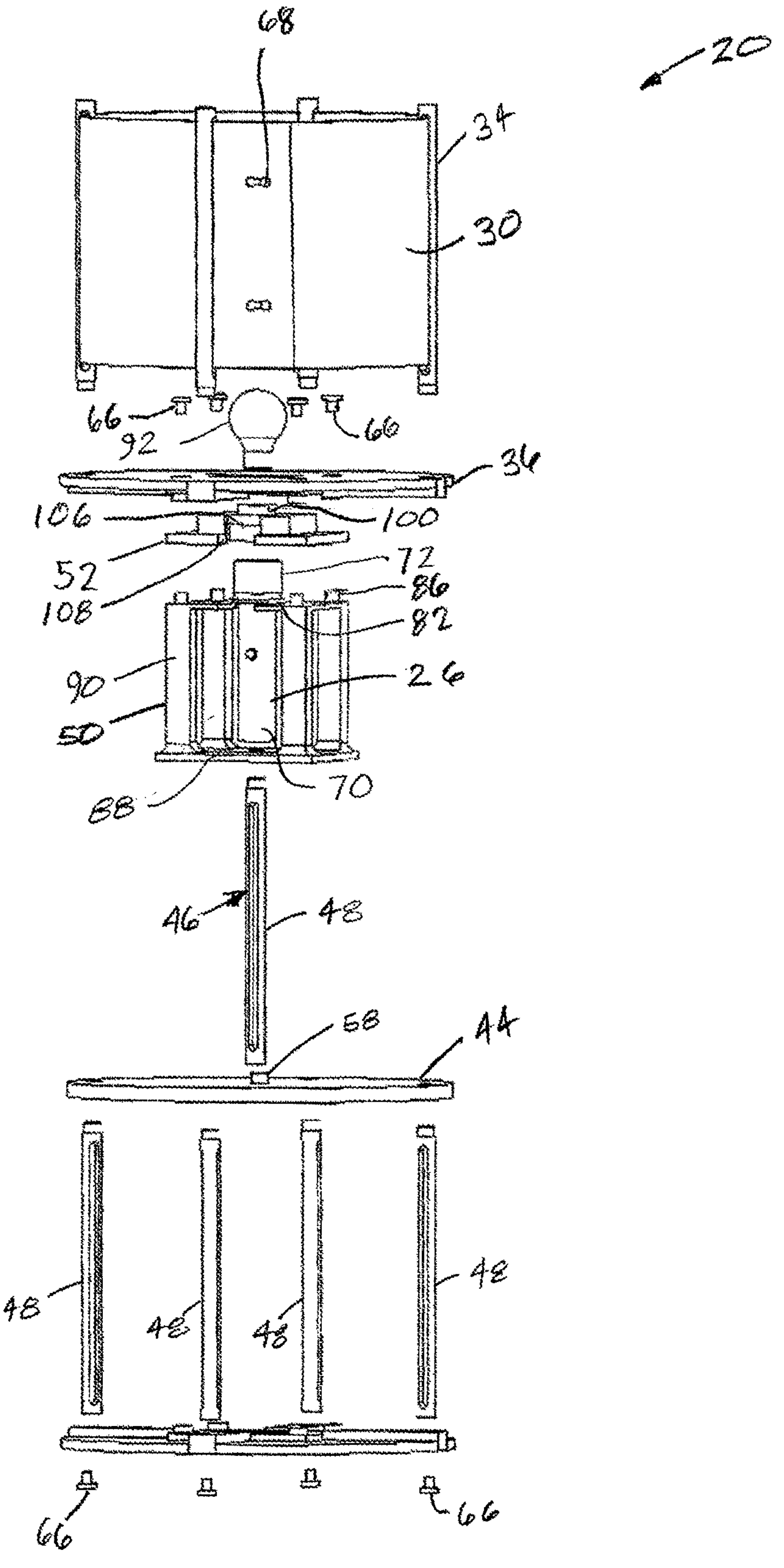
FIG. 22 is an exploded side elevation view of the modular lamp configured as a table lamp and incorporating the first shade configuration.
Figure 24:
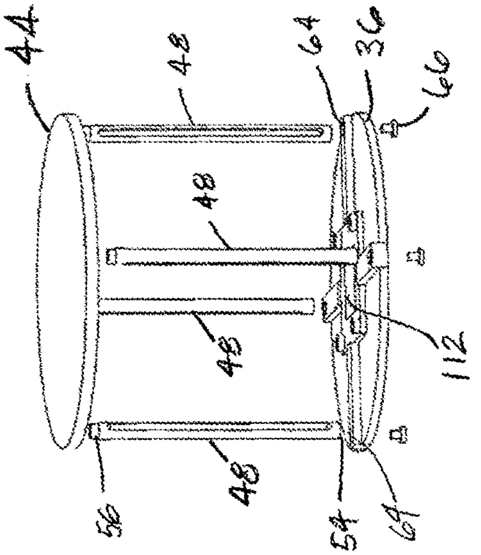
FIG. 24 is an exploded perspective view of portions of the modular lamp configured as an ottoman.
Figure 23:
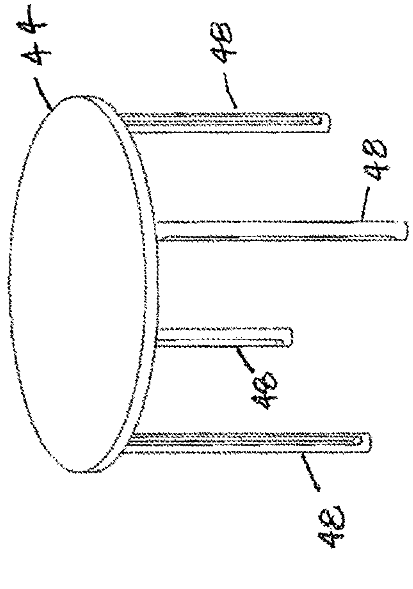
FIG. 23 is a perspective view of portions of the modular lamp configured as a table.

The body 22 is preferably formed of modular components that can be configured in multiple different configurations, depending on the needs and tastes of the user. For example, the body 22 may be configured as a floor lamp, as shown in FIGS. 1, 2A, 3A, 13A, and 14A, or it may be configured as a table lamp, as shown in FIG. 22. In addition, some components of the body 22 may be configured in other, non-lamp configurations, such as a table, eating tray, coffee table, or end table, as shown in FIG. 23, or as an ottoman, end table, small chair, or barstool, as shown in FIG. 24. In order to accomplish this, the body 22 may include a lamp base 44, a support column 46 formed by one or more rods 48, the shade base 36, and the shade ribs 34 also formed by rods 48.

Figure 19:
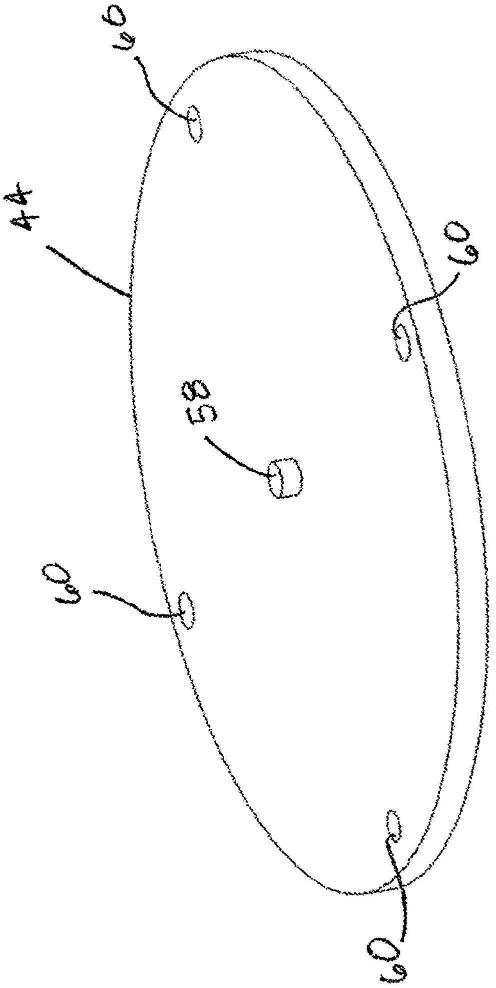
FIG. 19 is a perspective view of a lamp base of the modular lamp.
Figure 18:
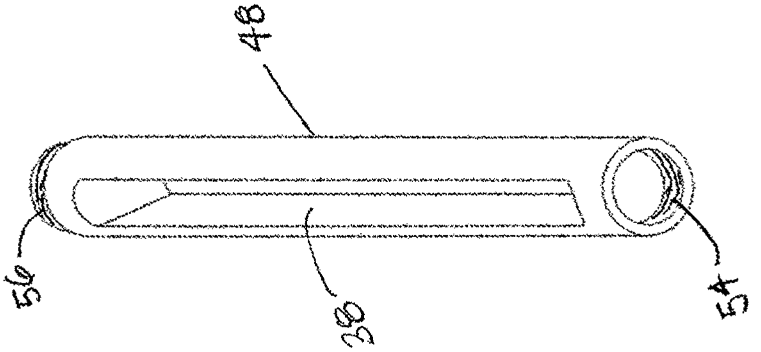
FIG. 18 is a perspective view of a rod that can be used as shade rib and/or a support column of the modular lamp.

In the floor lamp configurations represented in FIGS. 1, 2A, 3A, 13A, and 14A, the support column 46 can be formed of two, three, or more of the rods 48 connected end to end and extending upwardly from the lamp base 44, which is disposed on a stable support surface, such as a floor. The support column 46 thus formed is preferably about the height of the average person, for example between about 1 meter and 2 meters tall. As best seen in FIG. 18, each rod 48 has a first end with a female fitting 54 and second end with a male fitting 56. Each of the female fittings 54 and the male fittings 56 may be provided with respective female and male threads so as to form threaded fittings. Each male fitting 56 is configured to operatively engage any one of the female fittings 54 to form a secure connection between two of the rods 48 in an end-to-end figuration, for example, such that the male fitting 56 threadedly connects with the female fitting 54. The lamp base 44, as best seen in FIG. 19, includes a post 58 extending upwardly from the top surface and also configured to operatively couple with the female fitting 54 of the rod 48. The lamp base 44 may be in the form of a generally planar disk as shown, although other shapes are also possible. In the floor lamp configurations shown FIGS. 1, 2A, 3A, 13A, and 14A, the post 58 is preferably threaded with external male threads (not shown) as appropriate to threadedly couple to the female fitting 54 of a rod 48. The post 58 may also have a bore with internal female threads (not shown) to permit a part with male threads to be assembled to the base 44, as a nonlimiting example, an umbrella to permit the use of the base 44 in a patio furniture configuration.

The housing 50 and the adapter 52 are disposed at the top of the support column 46 and supported thereby. The housing 50 is configured to operatively couple with the flashlight 26 and in combination the housing 50 and adapter 52 are configured to operatively couple interchangeably with the lightbulb 28, as may be selected by a user. The housing 50 may be coupled directly to the top of the support column 46, for example with a threaded hole 60 that threadedly couples to the male fitting 56 of the rod 48 at the top end of the support column 46. The shade base 36, shade ribs 34 (which may be formed by rods 48) and the shade 30 are disposed on top of the adapter 52 such that the light source 24 extends upwardly through the shade base 36 and disperses light radially outwardly and is surrounded radially by the shade 30. Thus, in the floor lamp configurations shown FIGS. 1, 2A, 3A, 13A, 14A, and 22, the lamp base 44 can be placed on the floor or ground, and the light source 24 will be located above the floor at approximately chest or head height of a typical person with the body 22 an upright position.

One possible table lamp configuration can be best seen in FIG. 22. In this arrangement, the housing 50, adapter 52, shade base 36, shade ribs 34, and shade 30 are in generally the same configuration as in the floor lamp configuration, but the support column 46 extending between the lamp base 44 and the housing 50 is formed with only a single rod 48. In this arrangement, because the support column 46 is shorter than in the floor lamp configuration, the modular lamp 20 may be more suitable for being placed on a table or desk while still locating the light source 24 at or slightly above the typical location of a person when sitting at that a table or desk, for example, approximately 30 to 60 cm above the surface of the table or desk in the upright position.

Figure 17:
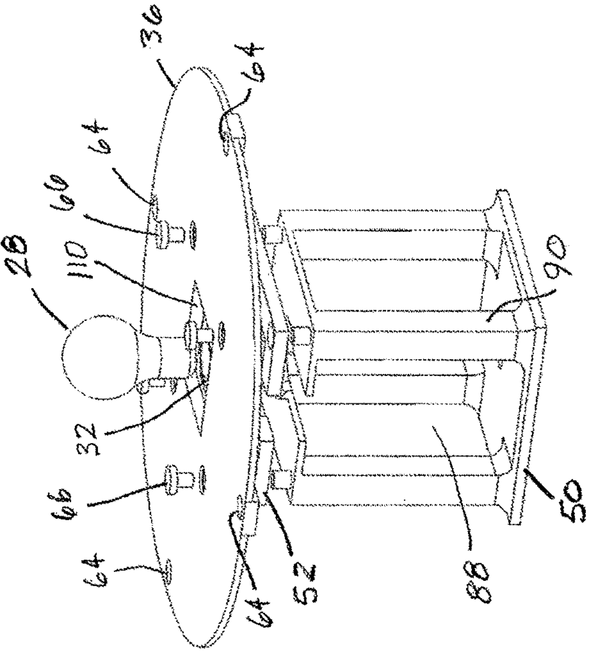
FIG. 17 is a perspective view of the components shown in FIG. 16 in a partially assembled configuration.
Figure 16:
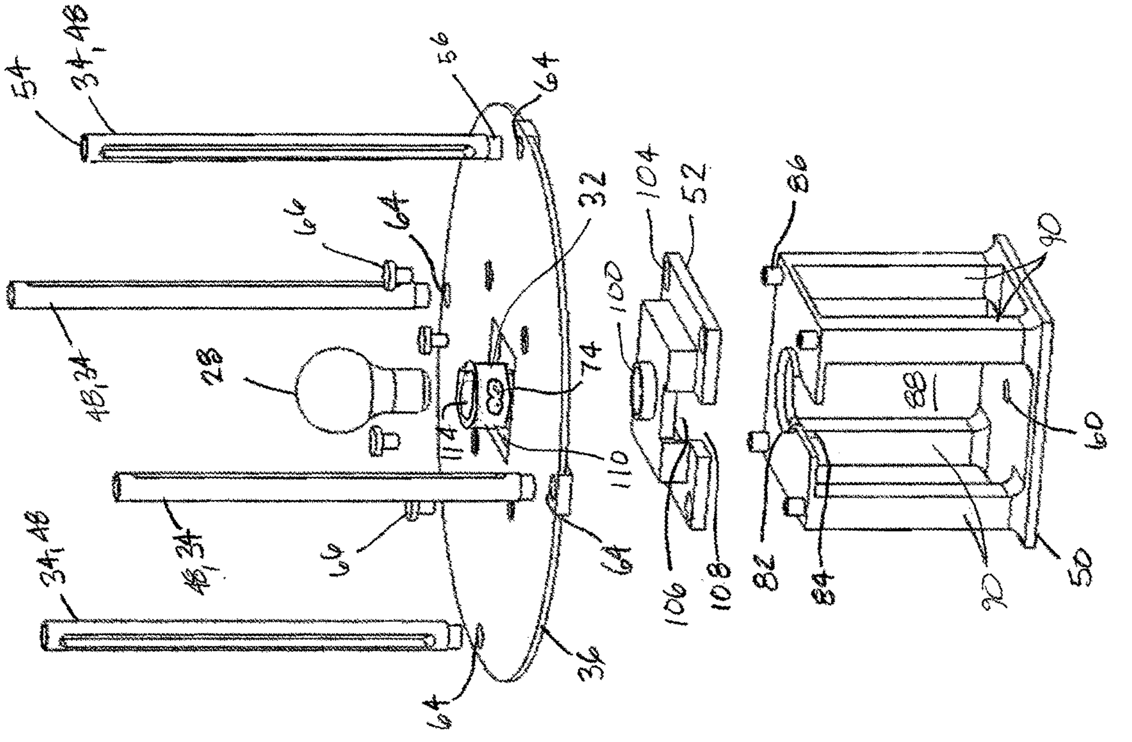
FIG. 16 is a perspective exploded view of the housing, adapter, socket adapter, lightbulb, shade base, and shade ribs of the configuration shown in FIGS. 14A and 14B and 15A and 15B.

Many other arrangements and configurations may also be possible due to the modularity of the modular lamp 20. For example, in another optional arrangement also seen in FIG. 22, an additional support assembly may be configured underneath and connected to the lamp base 44 using additional rods 48 and another shade base 36. In this optional configuration, four rods 48 extend upwardly from the second shade base 36, and the lamp base 44 is disposed on the top ends of the additional rods 48. As best seen in FIG. 19, the lamp base 44 has four threaded bores 62 extending therethrough disposed adjacent the outer radial edge of the lamp base and angularly spaced apart at approximately 90° from each other. Similarly, as best seen in FIGS. 16 and 17, the shade base 36 also includes threaded bores 64 extending therethrough disposed adjacent the outer radial edge thereof and angularly spaced apart approximately 90° from each other. Thus, returning to FIG. 22, the female fittings of the additional rods 48 in the table lamp configuration can be coupled to the second shade base 36 with threaded fasteners 66, such as screws or bolts, extending through the threaded bore 64, and the male fittings 56 of the additional rods 48 can be threadedly coupled to the threaded bores 62 of the lamp base 44. FIG. 23 shows an optional arrangement configured as a table, in which the lamp base 44 is turned over such that its bottom surface is used as a tabletop, and the male fittings 56 of four threaded rods 48 are threadedly coupled into the four threaded bores 62 to form table legs. FIG. 24 shows yet another optional arrangement configured as an ottoman, in which the tabletop configuration shown in FIG. 23 is modified to couple the shade base 36 to the bottom ends of the four rods 48 with threaded fasteners 66 through the threaded bore 64 generally similar to the arrangement shown in FIG. 22.

Figure 4B:
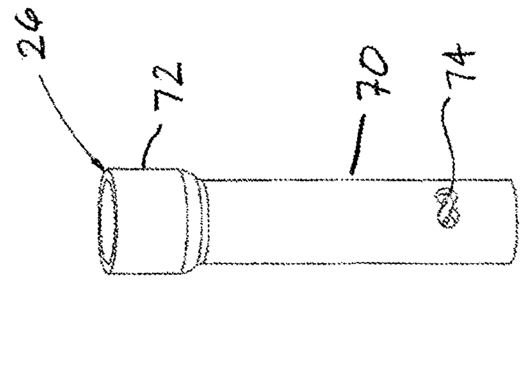
FIGS. 4A and 4B are perspective views of a flashlight, light diffuser, and electrical power cord for use in the configurations of FIGS. 2A and 2B and 3A and 3B.
Figure 4A:
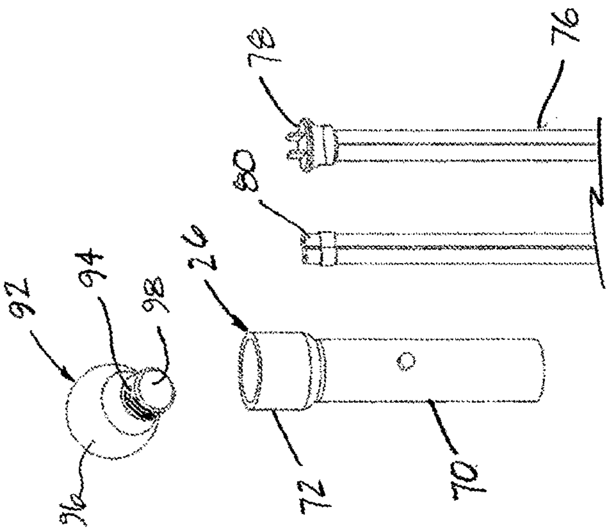

Turning now to features that enable the modular lamp 20 to interchangeably incorporate either the flashlight 26 or a lightbulb 28 as its light source 24, FIGS. 4A and 4B show details of a nonlimiting flashlight arrangement The flashlight 26 represented in the drawings is in the form of a standard handheld flashlight that includes an elongate body 70 that houses batteries, an enlarged head 72 that contains a lightbulb and reflector typical of handheld flashlights, and a circumferential step or other transition at the junction between the body 70 and the enlarged head 72. The flashlight 26 may have different shapes and configurations than that shown, as a nonlimiting example, a generally flat shape that can be supported within the housing 50, for example, with tabs 90A depicted in FIG. 5 as extending inward from columns 90 of the housing 50.

The flashlight 26 is preferably a rechargeable flashlight including rechargeable batteries. Therefore, the flashlight 26 also includes an electrical connector 74 for connecting a power source to recharge the rechargeable batteries. FIG. 4A shows an electrical power cord 76 with a standard wall plug 78 for releasably connecting to an electrical wall socket at one end and a light plug 80 at the other end for releasably connecting to the electrical connector 74 in a typical manner. In this way, the electrical power cord 76 serves as a power circuit that can be used to recharge the batteries in the flashlight 26 and provide operating power for the flashlight 26 when operatively installed in the modular lamp body 22 as described hereinafter. In FIGS. 9 through 12, lamp assemblies are represented as equipped with a filament-less diffuser bulb 92 to further enhance the distribution and dispersion of light emitted from the flashlight 26. As represented in FIG. 4A, the diffuser bulb 92 has the general form of a typical lightbulb having a threaded a base 94 for inserting into a socket and a light diffuser 96 coupled to an end of the base, but does not include a filament element. Rather, the base 94 has a central through-bore 98 extending axially through the base 94 so that light from the flashlight 26 can shine through the through-bore 98 into the interior of the light diffuser 96. This allows the diffuser bulb 92 to diffuse and/or disperse light from the flashlight 26 radially outwardly as well as axially, similar to a typical lightbulb. As will be seen hereinafter, the diffuser bulb 92 may optionally be used along with the flashlight 26 when operatively mounted in the modular lamp 20 so that the light pattern formed by the light source 24 more closely resembles the light pattern formed by a typical lightbulb. Preferably, the base 94 is a threaded base configured to threadedly engage with a threaded socket.

Figure 6:
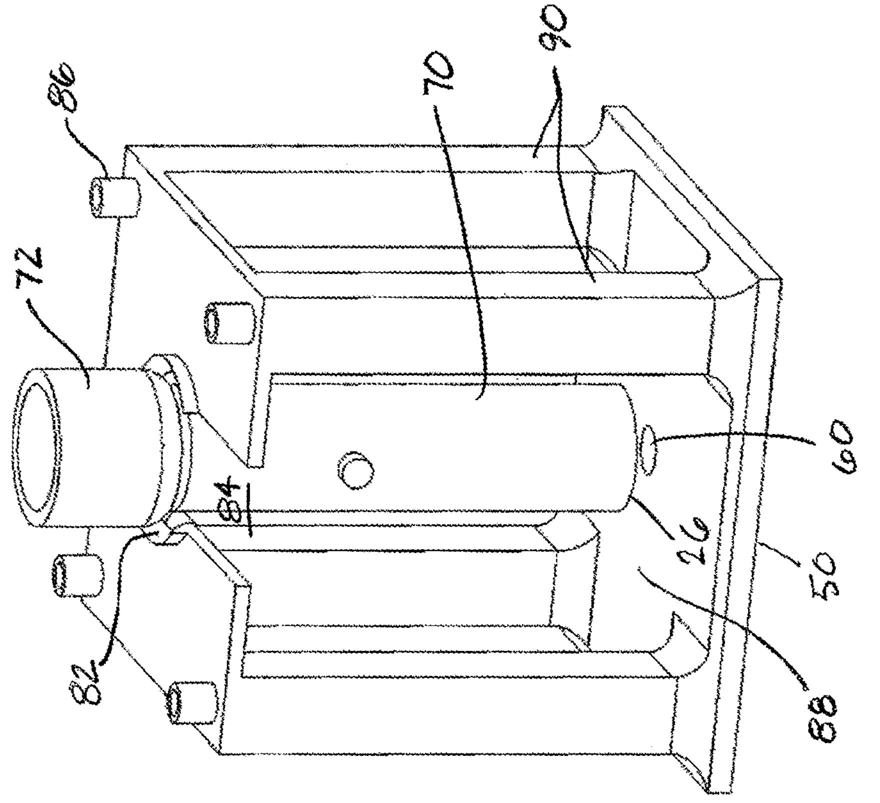
FIG. 6 is a perspective view of the housing with the flashlight operatively mounted therein.
Figure 5:
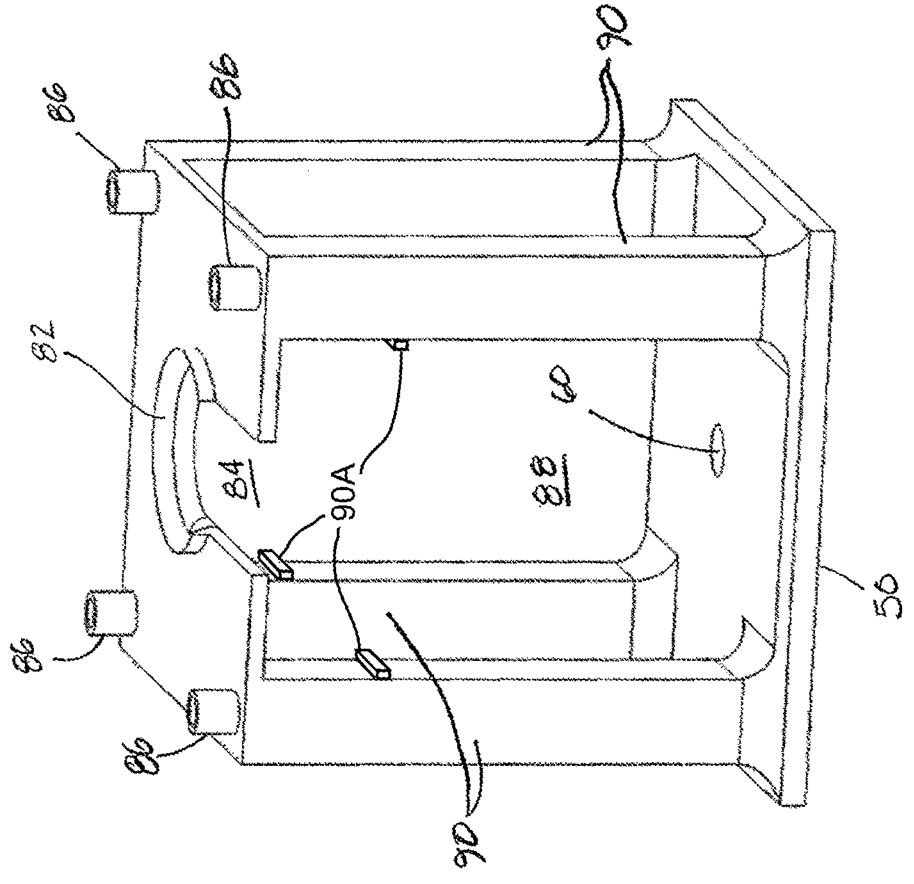
FIG. 5 is a perspective view of a housing of the modular lamp.

FIGS. 5 and 6 show details of the housing 50 and how the flashlight 26 is operatively received by the housing 50. The housing 50 has an interior that defines a receptacle for the flashlight 26. The housing 50 has a base portion with the threaded hole 60 that couples to the top end of the support column 46 as previously described, and a top portion that defines a receiver 82 configured to receive and hold the flashlight 26. The receiver 82 is configured to hold the flashlight 26 in a generally vertical operative position with its head 72 resting on and/or in the receiver 82 and its body 70 extending downwardly through and/or below the receiver 82 in a space between the top portion and the base portion. The receiver 82 is preferably sized to engage the circumferential step at the base of the flashlight head 72. A lateral slot 84 extends through the top portion radially outwardly from the receiver 82 to the peripheral edge of the top portion. The lateral slot 84 is slightly narrower than the inside diameter of the receiver 82 such that the body 70 of the flashlight 26 can fit laterally through the lateral slot 84 and a lateral window 88 through a lateral side of the housing 50. In this way, the flashlight 26 can be laterally inserted into and/or removed from the receiver 82 through the lateral slot 84. Four pegs 86 defining threaded female fittings extend upwardly from peripheral locations around the top portion for engaging with the adapter 52. The columns 90 maintain the base portion spaced apart from the top portion and define the lateral window 88 through the lateral side wall. However, other configurations suitable to form the receiver 82, lateral slot 84, and lateral window 88 for inserting, holding, and removing the flashlight 26 as described may be used.

Figure 2A:
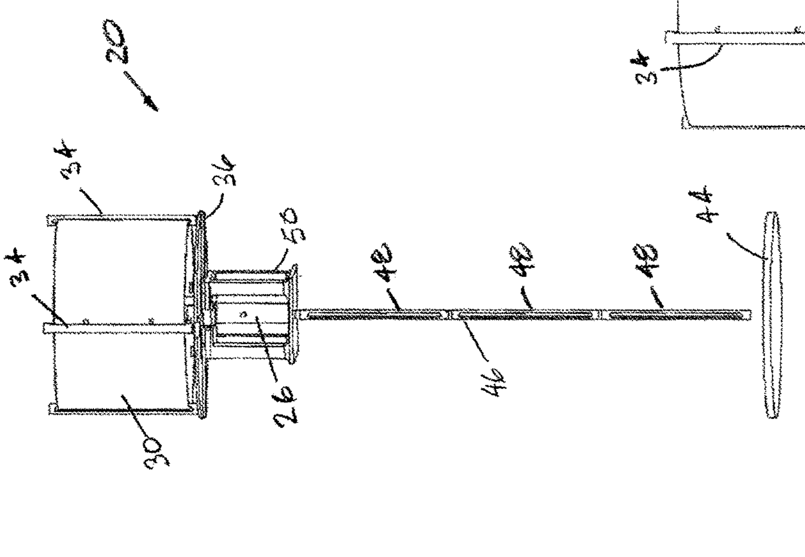
FIGS. 2A and 2B are perspective views of a modular lamp of the modular lamp configured as a floor lamp with a flashlight as a light source and incorporating a first shade option.
Figure 2B:
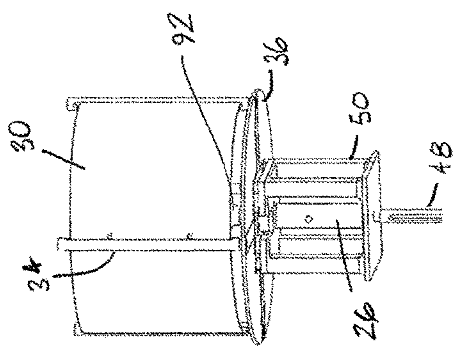
Figure 3A:
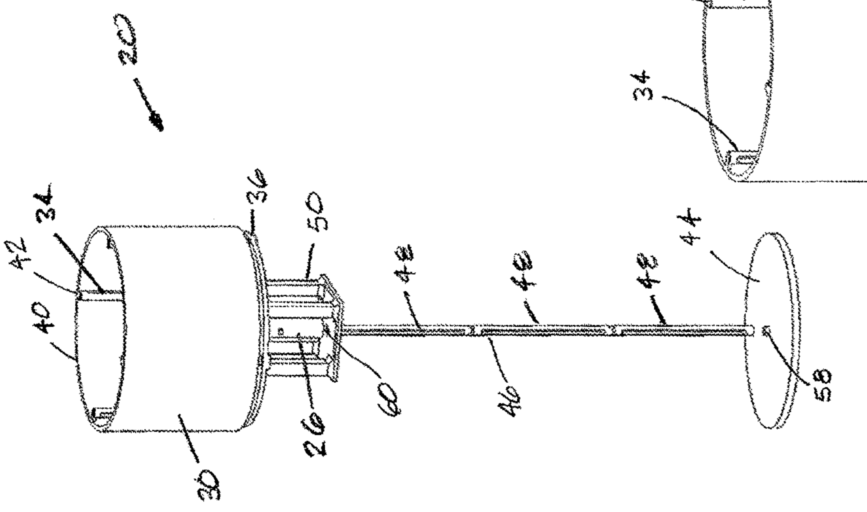
FIGS. 3A and 3B are perspective views of the modular lamp in the configuration of FIGS. 2A and 2B and incorporating a second shade option.
Figure 3B:
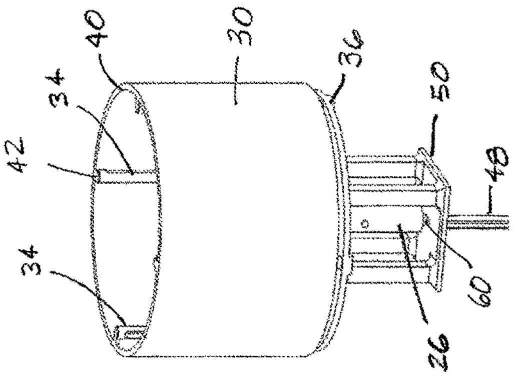
Figure 7:
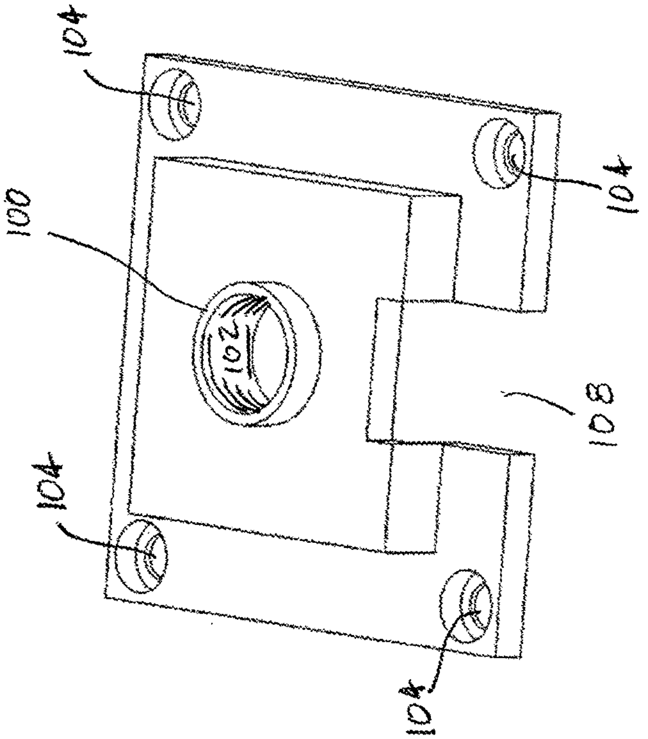
FIG. 7 is a perspective view of an adapter of the modular lamp.
Figure 8:
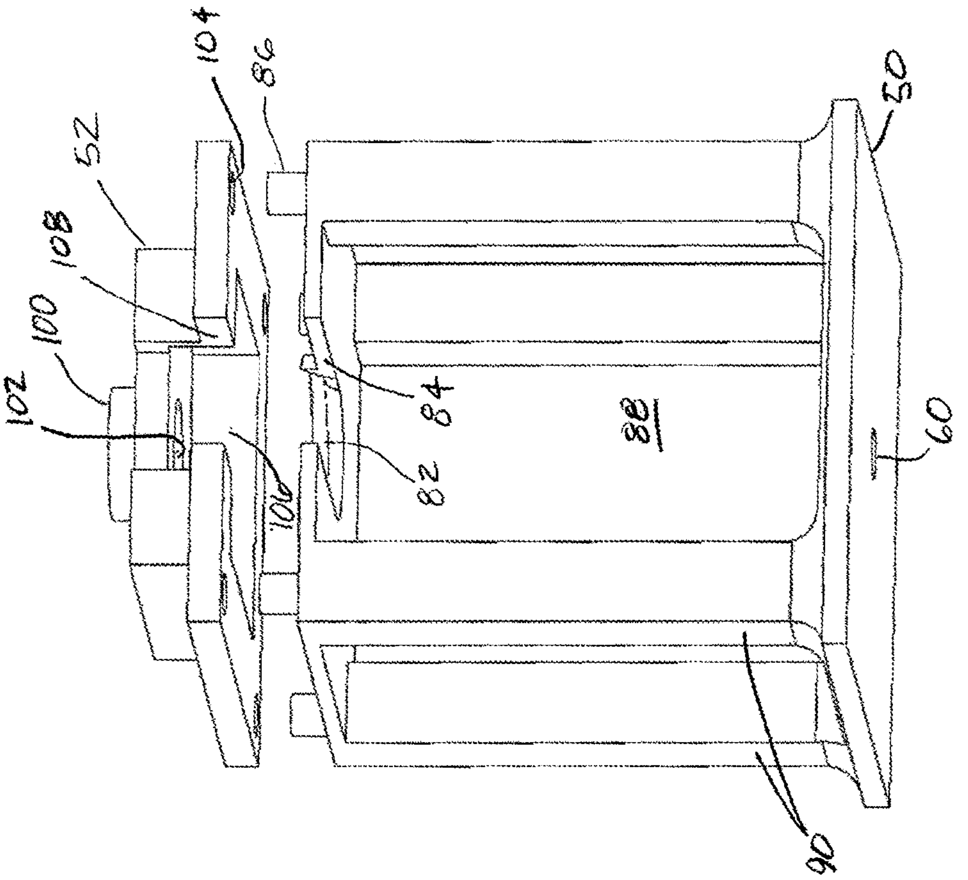
FIG. 8 is an exploded perspective view of the adapter and the housing.
Figure 9:
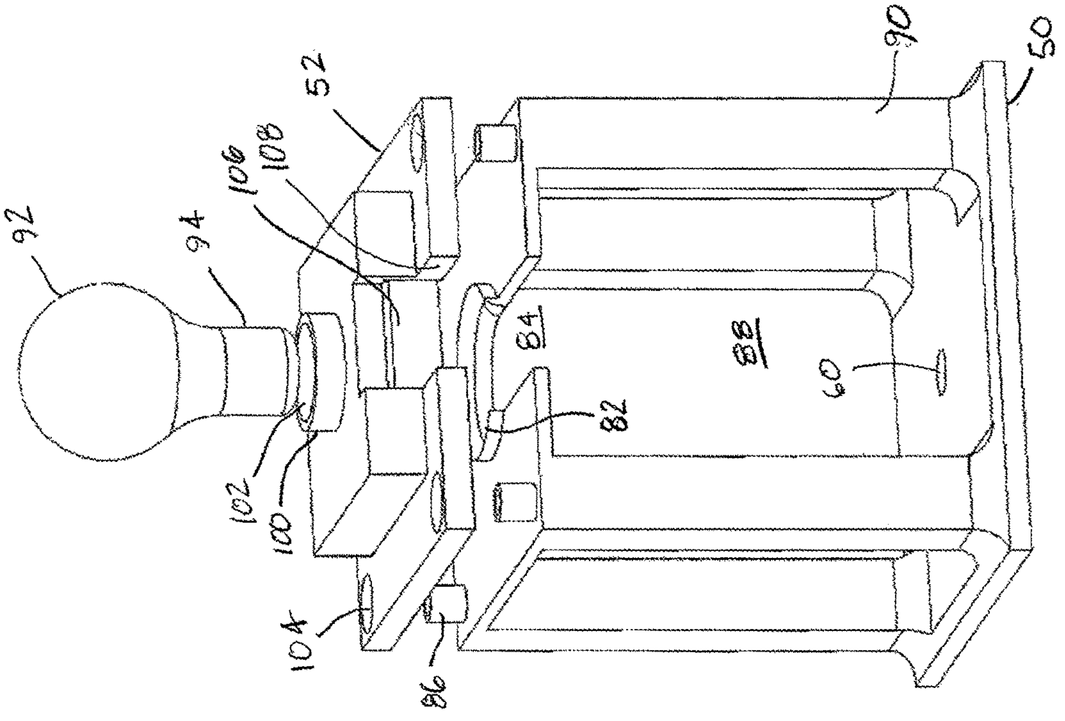
FIG. 9 is an exploded perspective view of the adapter and the housing with a diffuser bulb.

FIGS. 7-9 show details of the adapter 52 and how the adapter 52 and the housing 50 fit together. In combination, the housing 50 and adapter 52 form a receptacle for the light bulb 28. As best seen in FIG. 8, the adapter 52 assemblies onto the top portion of the housing 50 such that a socket 100 is axially aligned directly above the receiver 82. The socket 100 is defined by a through-bore 102 extending through a central portion of an upper portion surface of the adapter 52. In the present examples, the socket 100 is a threaded socket. Four post holes 104 through a lower portion of the adapter are disposed around an outer periphery of the lower portion and aligned with the four respective pegs 86 on the housing 50. The post holes 104 may be countersunk into the top surface of the bottom. When fully assembled, the pegs 86 extend upwardly through the respective the post holes 104 to ensure proper alignment of the adapter 52 on top of the housing 50 such that the threaded socket 100 and through-bore 102 are disposed directly axially above the receiver 82 to ensure that light from the flashlight 26 shines upwardly through the through-bore 102 when operatively disposed in the receiver 82. The upper portion of the adapter 52 extends upwardly from the lower portion and forms a cavity 106 on the bottom side of the adapter 52 that is sized to receive the head 72 of the flashlight 26 therein. Another lateral slot 108 extends laterally from a peripheral edge of the adapter 52 to the upper portion, thereby forming a lateral window into the cavity 106 through which the head 72 of the flashlight 26 can fit. When assembled, the lateral slot 108 is vertically aligned with the lateral slot 84 in the housing 50, as best seen in FIGS. 8 and 9. Thus, when the adapter 52 is operatively assembled on to the top of the housing 50, the flashlight 26 can be laterally inserted into and removed from the receiver 82 with the flashlight head 72 disposed in the cavity 106 and resting on the receiver 82, as best seen in FIGS. 2B, 11, and 12, without having to remove the adapter from the housing.

Figure 10:
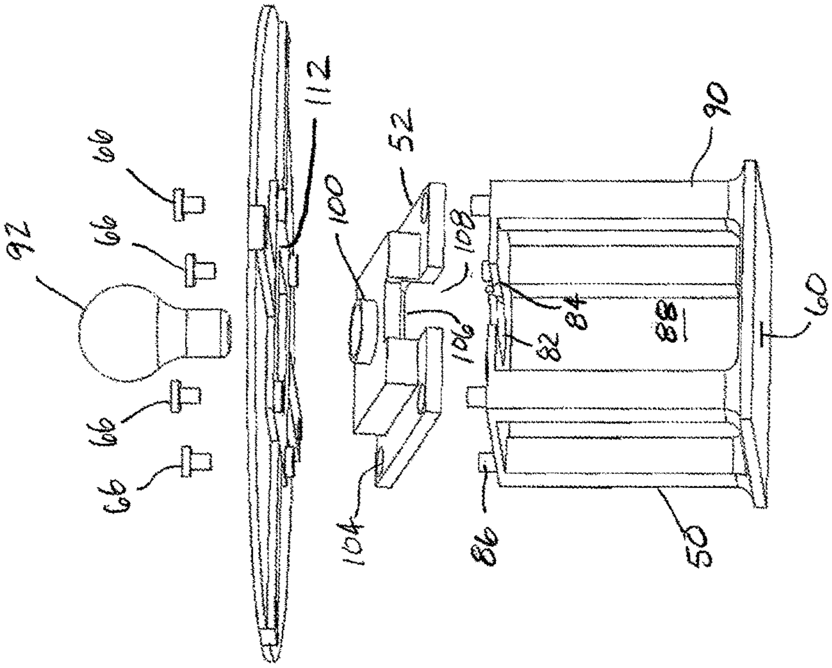
FIG. 10 is an exploded perspective view of the housing, the adapter, the diffuser bulb, and a shade base.
Figure 12:
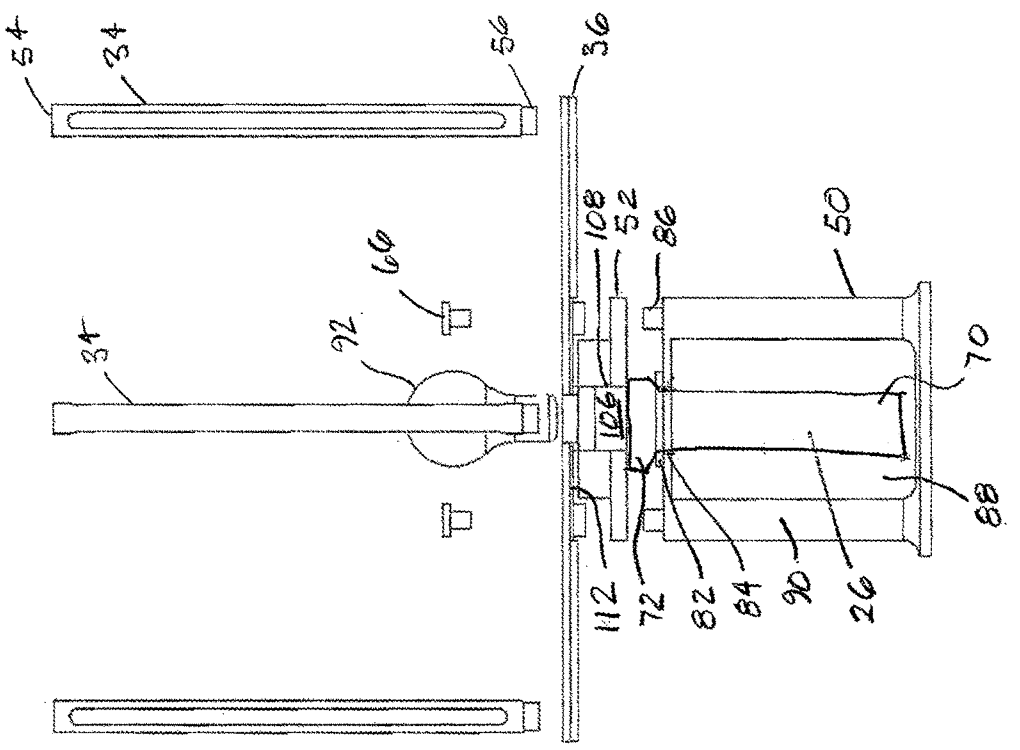
FIG. 12 is a side elevation view of the partial assembly shown in FIG. 11.
Figure 11:
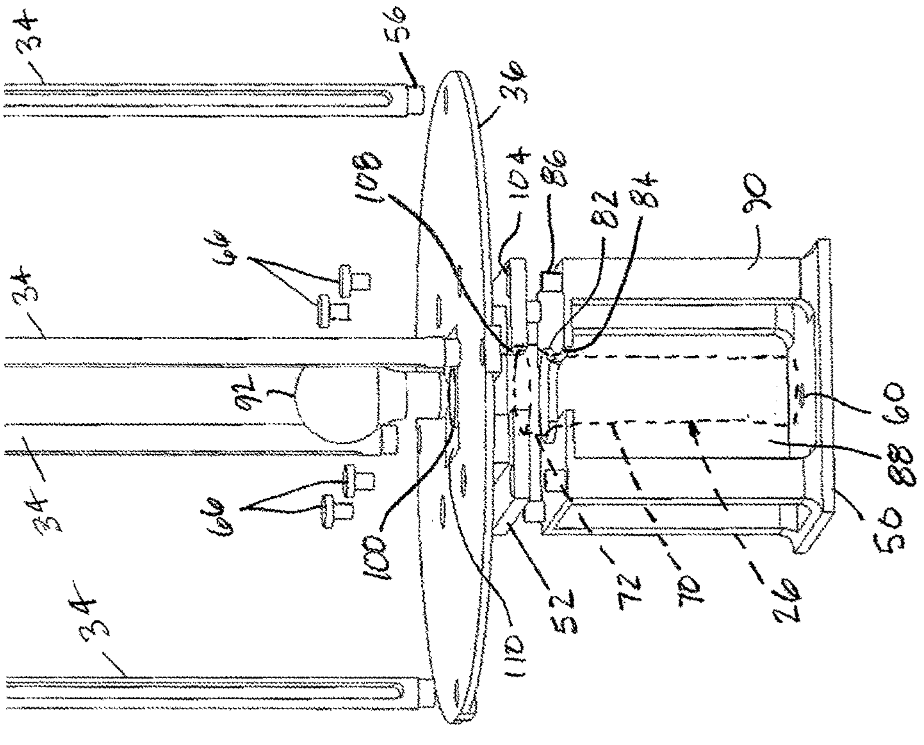
FIG. 11 is a perspective view of the housing, the adapter, the shade base, the diffuser bulb, shade ribs, and the flashlight, in a partially assembled configuration.
Figure 14B:
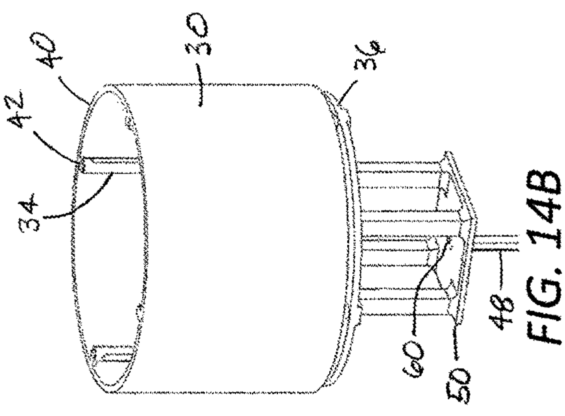
FIGS. 14A and 14B are perspective views of the modular lamp in the configuration of FIGS. 13A and 13B and incorporating the second shade option.
Figure 14A:
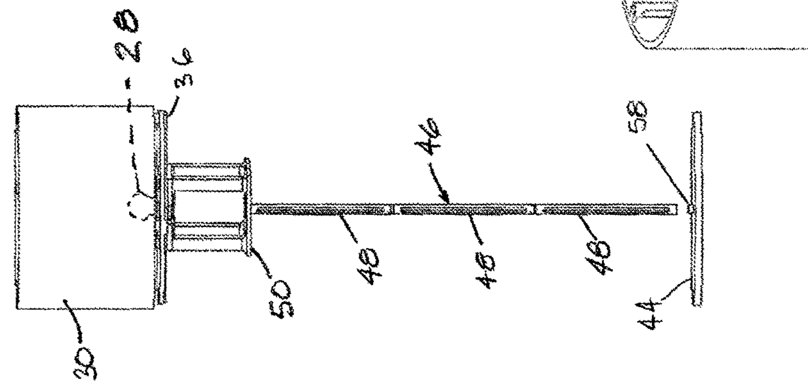
Figure 13B:
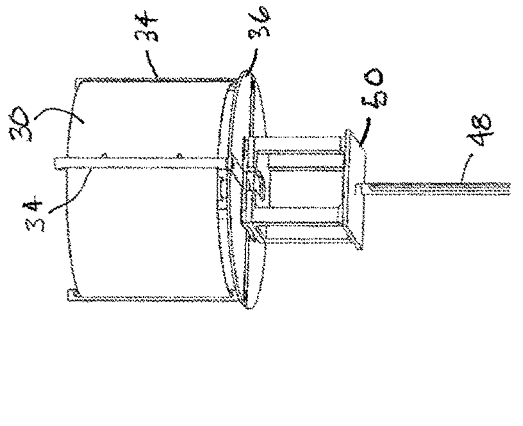
FIGS. 13A and 13B are perspective views of the modular lamp configured as a floor lamp with a lightbulb as a light source and incorporating the first shade option.
Figure 13A:
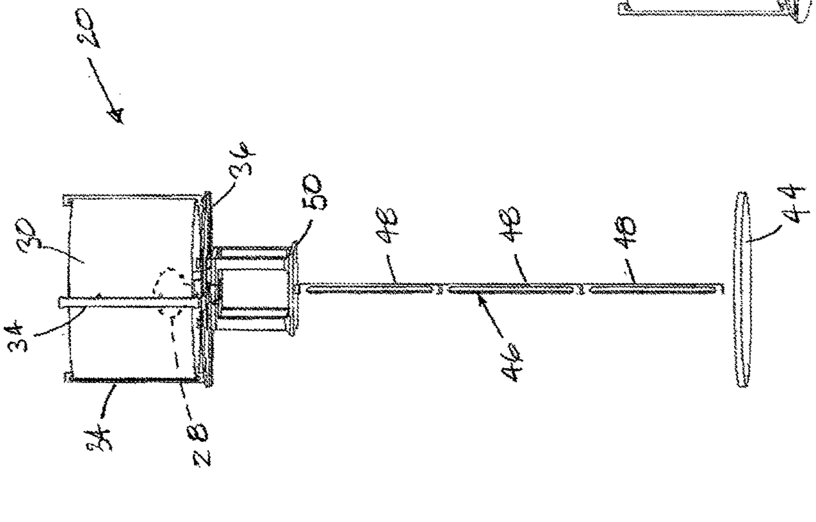

As best seen in FIGS. 10-12, the shade base 36 is disposed on top of the adapter 52 in the assembled position. The shade base 36 may be in the form of a generally planar disk as shown, although other shapes are also possible. A central opening 110 through the shade base 36 is axially aligned above the socket 100 and the receiver 82. The central opening 110 is sized to allow the diffuser bulb 92 or the lightbulb 28 to project upwardly from the socket 100 through and above the top surface of the shade base 36. A recess 112 is formed on the bottom surface of the shade base to partly receive and interlock with the top portion of the adapter 52 in the assembled position. In this example, both the top portion of the adapter 52 and the recess 112 have complementary square or rectangular shapes that nest together; however, other nesting shapes are also possible. The shade base 36 may be secured in the assembled position on top of the adapter 52 with threaded fasteners 66 extending through complementary holes through the shade base and coupling to the pegs 86.

As best seen in FIGS. 11 and 12, with the shade base 36 the adapter 52 and the housing 50 thus assembled, the flashlight 26 may be inserted into and removed from the receiver 82 through the aligned lateral slots 84 and 108 and the window 88 so that a light beam of the flashlight 26 would be directed upwardly through the socket 100. Thus installed, the light plug 80 of the electrical power cord 76 may be inserted into the electrical connector 74 on the flashlight 26 to provide power thereto. To improve the dispersion pattern of light from the flashlight 26, the diffuser bulb 92 can be screwed into the top of the socket 100 so that light from the flashlight 26 shines up through its base 94 and into the diffuser bulb 92, which disperses and or diffuses the light radially in a more spheric pattern. As discussed previously, the shade ribs 34, which in this case are threaded rods 48, are threaded into the radially outside ring of threaded bores 64 using the male fitting 56 so that the shade 30 can radially surround and shade the diffuser bulb 92 when supported by the shade ribs.

Figure 15B:
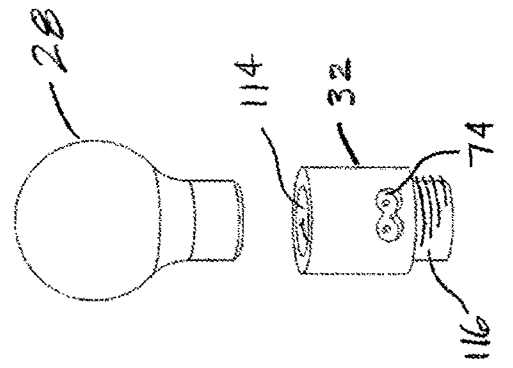
FIGS. 15A and 15B are perspective views of a lightbulb, a socket adapter, and an electrical power cord for use in the configuration of FIGS. 14A and 14B and 15A and 15B.
Figure 15A:
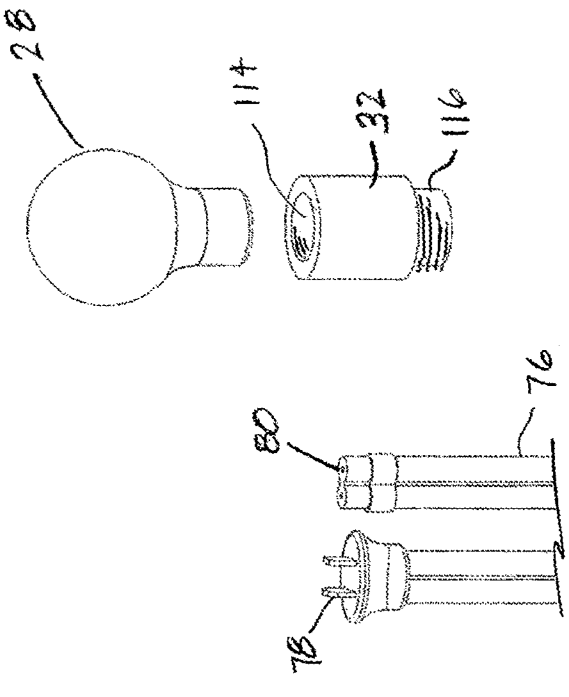

FIGS. 13A-14B show the modular lamp 20 with the lightbulb 28 incorporated as the lights source 24 rather than the flashlight 26. FIGS. 15A and 15B show a lightbulb arrangement that can be interchangeably used with the modular lamp 20 in lieu of the flashlight arrangement. The lightbulb arrangement includes the lightbulb 28, which can be a standard screw in electric lightbulb with a threaded base and an electric light source, such as a filament, heated gas, LEDs, etc. The threaded base of the lightbulb 28 screws into an electrical socket 114 disposed on a top end of the socket adapter 32. The socket adapter 32 also includes a threaded base 116 at its opposite end that is configured to screw into the threaded socket 100 on the adapter 52. An electrical connector 74 as described previously relative to the flashlight 26 is provided in the socket adapter 32 so that the light plug 80 of the electrical power cord 76 can be releasably plugged into and provide electrical power to the electrical socket 114. As best seen in FIGS. 16 and 17, the lightbulb 28 can be interchanged with the flashlight 26 and diffuser bulb 92 to provide the light source 24 for the modular lamp 20. With the flashlight 26 and the diffuser bulb 92 removed, the base 116 of the socket adapter 32 is screwed into the threaded socket 100 and the lightbulb 28 is screwed into the electrical socket 114 such that the diffuser bulb portion of the lightbulb 28 is disposed slightly above the top surface of the shade base 36. Thus installed, the light plug 80 of the electrical power cord 76 serves as a power circuit that may be inserted into the electrical connector 74 on the socket adapter 32 to provide power to the lightbulb 28.

Although the socket 100 has been generally described as a threaded socket, in some arrangements, the socket 100 may not be threaded but simply receive the base of the diffuser bulb 92 for the base of the socket adapter 32 without threaded engagement and/or have other coupling mechanisms for engaging a base of the diffuser bulb 92 and/or the base 116 of the socket adapter 32.

The electrical power cord 76 may be carried in any convenient fashion by the body 22 of the modular lamp 20. In some arrangements, the power cord 76 may be threaded through the longitudinal slots 38 of the rods 48 to follow the support column 46 upwardly from the lamp base 44 to the housing 50. In some arrangements, the rods 48 may be hollow rods with a longitudinal bore extending therethrough from the female fitting 44 to the male fitting 56, and the threaded post 58 and the lamp base may also have a through-bore extending axially therethrough. In such an arrangement, the electrical power cord 76 may extend through the threaded post 58 and up the center axis of the support column 46 as defined by the longitudinal bores of the hollow rods 48 and finally through the threaded hole 60. Other arrangements for the power cord 76 are also possible.

The modular lamp 20 so described can be used in different ways. For example, when used with the flashlight 26, the flashlight 26 may be used as the light source 24 of the modular lamp 20. In addition, the user can remove the flashlight 26 from the body 22 and then use the flashlight 26 separately from the body just like a typical handheld flashlight. Because the flashlight 26 is conveniently located in the body 22, the user can quickly and easily locate the flashlight 26 and be assured that its batteries will be charged when needed because it is connected to a power source via the electrical power cord 76 while operatively installed in the body 22. When the user is finished using the flashlight 26 as a handheld flashlight, the flashlight 26 may be reinstalled into the body 22 as described previously, and then the flashlight 26 may be recharged and/or used to as the light source 24 of the modular lamp 20 shaded by the shade 30. The diffuser bulb 92 may optionally be inserted into the top end of the socket 100 so as to further disperse and/or diffuse the light beam emitted upwardly from the head 72 of the flashlight 26.

In addition, the user may interchange the flashlight 26 with the lightbulb 28 so that the light source 24 is provided by the lightbulb 28 rather than the flashlight 26. In order to do this, for example, the flashlight 26 may be removed from the body 22 as previously described, and (if installed) the diffuser bulb 92 may be unscrewed and removed from the top of the socket 100. Thereafter, the base 116 of the socket adapter 32 may be screwed into the socket 100, and the lightbulb 28 may be screwed into the electrical socket 114 of the socket adapter 32. The light plug 80 of the electrical power cord 76 may then be coupled to the electric connector 74 to provide electric power to the lightbulb 28. If it is desired to again use the modular lamp 20 with the flashlight 26 rather than the lightbulb 28, the socket adapter 32 and lightbulb 28 may be removed, and the flashlight 26, and optionally the diffuser bulb 92, may again be installed as previously described.

Due to the modularity of the individual pieces, the modular lamp 20 may be used as a lamp, table, ottoman, etc. in any of the various configurations described herein, as well as other possible configurations possible with the pieces, by an end user according to his/her functional needs and/or aesthetic tastes. For example, the user may select to assemble the modular lamp 20 as a floor lamp or table lamp by arranging the rods 48 differently relative to the support column 46, as described relative to FIGS. 2A-B, 3A-B 13A-B, 14A-B, and 22. Alternatively, the user may select to assemble modular lamp 20 as a table or ottoman, as described relative to FIGS. 23 and 24. The user may select to assemble the shade 30 in the first configuration as described relative to FIGS. 2A-B, 13A-B, 20A-B, and 22, or the user may select to assemble the shade 30 in the second configuration as described relative to FIGS. 3A-B, 14A-B, and 21A-B. The user may also select to assemble the modular lamp 20 to incorporate either the flashlight 26 or the lightbulb 28 as the light source 24, and may thereafter easily interchange the originally selected light source, whether the flashlight 26 or the lightbulb 28, for the other light source without having to disassemble the body 22. Thus, the modular lamp 20 provides increased flexibility to be assembled, used, and changed by the user to meet different functional needs and/or aesthetic tastes, both when initially assembled and for changing needs and/or tastes thereafter.

As previously noted above, though the foregoing detailed description describes certain aspects of one or more particular embodiments of the invention, alternatives could be adopted by one skilled in the art. For example, the modular lamps 20 and their components could differ in appearance and construction from the embodiments described herein and shown in the drawings, functions of certain components of the modular lamps 20 could be performed by components of different construction but capable of a similar (though not necessarily equivalent) function, and various materials could be used in the fabrication of the modular lamps 20 and/or their components. As such, and again as was previously noted, it should be understood that the invention is not necessarily limited to any particular embodiment described herein or illustrated in the drawings.

The invention claimed is:

1. A modular lamp comprising:

a body comprising a housing having a receiver and an adapter coupled to the housing and having a through-bore defining a socket that is axially aligned with the receiver;

at least first and second light sources, wherein the housing and the receiver thereof are configured to interchangeably receive and operate each of a flashlight and a lightbulb with a filament therein as the first and second light sources, respectively; and a shade supported by the body, wherein the shade is configured to shade the first and second light sources when received in the housing;

wherein the housing and the receiver thereof are configured to facilitate removal of the flashlight from the housing for use separately from the body and reinstalled to the housing for use as the first light source for the modular lamp, the adapter is configured such that light from the flashlight supported in the housing shines through the through-bore, and the housing and the receiver thereof are configured for the flashlight to be inserted into and/or removed from the housing and the receiver without removing the adapter.

2. The modular lamp of claim 1, wherein the body can be interchangeably configured as a floor standing lamp and as a table lamp.

3. The modular lamp of claim 1, wherein the socket is configured to operatively receive the lightbulb and provide power to the filament of the lightbulb.

4. A method of using the modular lamp of claim 1, the method comprising:

removing the flashlight from the housing;

using the flashlight separately from the housing; and using the flashlight to provide the light thereof while installed in the housing.

5. The modular lamp of claim 1, wherein the body further comprises:

a lamp base;

a shade base; and a plurality of threaded rods configured to support the shade;

wherein the lamp base and the threaded rods can be reconfigured as a table comprising the lamp base defining a tabletop supported by the plurality of threaded rods defining table legs.

6. The modular lamp of claim 5, wherein the lamp base, shade base, and the threaded rods can be reconfigured as an ottoman comprising the lamp base defining a top surface spaced apart from the shade base defining a bottom surface, and each of the threaded rods extending from the lamp base to the shade base to support the lamp base from the shade base.

7. A modular lamp comprising:

a body including a lamp base configured to be placed on a support surface to maintain the body in an upright position, a housing disposed above the lamp base and having a receiver, and an adapter coupled to the housing and having a through-bore defining a socket that is axially aligned with the receiver; and a light source supported by the housing, wherein the light source comprises a flashlight;

wherein the housing and the receiver thereof are configured to facilitate removal of the flashlight from the housing for use separately from the body and reinstalled to the housing for use as the light source for the modular lamp, the adapter is configured such that light from the flashlight supported in the housing shines through the through-bore, and the housing and the receiver thereof are configured for the flashlight to be inserted into and/or removed from the housing without removing the adapter.

8. The modular lamp of claim 7, further comprising:

the flashlight operatively disposed in the receiver of the housing; and a diffuser bulb removably received in an upper end of the socket, wherein the diffuser bulb but does not include a filament element;

wherein the light from the flashlight is received within the diffuser bulb and diffused outwardly from the diffuser bulb above the adapter.

9. The modular lamp of claim 8, wherein the diffuser bulb includes a base that operatively fits into the socket and a light diffuser coupled to the base, wherein the base defines an opening therethrough by which the light from the flashlight enters the diffuser.

10. The modular lamp of claim 9, wherein the socket is a threaded socket, and the base of the diffuser bulb threadedly engages with the threaded socket.

11. The modular lamp of claim 8, wherein the flashlight comprises a rechargeable battery configured to be recharged while operatively disposed in the receiver.

12. The modular lamp of claim 7, further comprising:

a cavity disposed between the socket and the receiver, the cavity configured to receive a head of the flashlight between the housing and the receiver;

wherein the housing comprises a first lateral slot extending from the receiver to an outer periphery of the housing, the first lateral slot configured to pass a body of the flashlight laterally therethrough into and out of the receiver;

wherein the adapter comprises a second lateral slot aligned with the first lateral slot and extending into the cavity, the second lateral slot configured to pass the head of the flashlight laterally therethrough into and out of the cavity; and wherein to remove and the flashlight from the body of the lamp, the flashlight can be removed from the receiver and the cavity laterally though the first lateral slot and the second lateral slot.

13. The modular lamp of claim 7, further comprising a socket adapter removably received in an upper end of the socket, wherein the light source further comprises an electric lightbulb having a filament therein, and the socket adapter defines an electrical socket configured to operatively receive and provide power to the filament of the electric lightbulb.

14. The modular lamp of claim 13, wherein the socket is a threaded socket, and wherein the socket adapter comprises a base that threadedly engages with the threaded socket.

15. The modular lamp of claim 13, wherein the socket adapter further comprises an electrical connector configured to releasably couple with an electric power cord to provide electric power to the filament of the electric lightbulb when operatively received in the electrical socket.

16. The modular lamp of claim 7, wherein the body further comprises a support column extending from the lamp base to the housing, wherein the support column carries the housing, the adapter, and the shade.

17. The modular lamp of claim 7, wherein the body further comprises:

a shade supported by the body, wherein the shade is configured to shade the light source;

a shade base disposed above the adapter, wherein the shade base carries the shade; and an opening through the shade base aligned axially above the socket, wherein the opening is configured to receive a lightbulb at least partly therethrough.

18. The modular lamp of claim 17, wherein the body further comprises:

a plurality of ribs extending upwardly from the shade base, each rib comprising a longitudinal slot extending between a first end and a second end, a male fitting at the first end, and a female fitting at the second end;

wherein the male fittings are coupled to the shade base; and wherein the shade may be selectively mounted to the ribs in the first configuration extending through the longitudinal slots or mounted to the ribs in the second configuration coupled to the female fittings, and wherein in both the first configuration and the second configuration, the shade surrounds the light source.

19. A modular lamp comprising:

a light source comprising a rechargeable flashlight and optionally a light bulb;

a body comprising a housing that provides a receptacle in which the light source is received, the body further comprising an adapter coupled to the housing and having a through-bore defining a socket that is aligned with the receptacle; and a power circuit configured to selectively provide power to either of the receptacle and the light source;

wherein the housing is configured to facilitate removal of the rechargeable flashlight from the receptacle for use separately from the housing and installed in the receptacle for use as the light source for the modular lamp, the adapter is configured such that light from the rechargeable flashlight installed in the receptacle shines through the through-bore, and the housing is configured for the rechargeable flashlight to be inserted into and/or removed from the receptacle without removing the adapter.

20. The modular lamp of claim 19, wherein the body can be interchangeably configured as a floor standing lamp and as a table lamp.

21. The modular lamp of claim 19, wherein the body further comprises:

a lamp base;

a shade base; and a plurality of threaded rods configured to support the shade;

wherein the lamp base and the threaded rods can be reconfigured as a table comprising the lamp base defining a tabletop supported by the plurality of threaded rods defining table legs.

22. The modular lamp of claim 21, wherein the lamp base, shade base, and the threaded rods can be reconfigured as an ottoman comprising the lamp base defining a top surface spaced apart from the shade base defining a bottom surface, and each of the threaded rods extending from the lamp base to the shade base to support the lamp base from the shade base.

* * * * *